US008806526B2

(12) United States Patent
Rodgers

(10) Patent No.: US 8,806,526 B2
(45) Date of Patent: Aug. 12, 2014

(54) SECURITY PROCESSING UNIT WITH SECURE CONNECTION TO HEAD END

(71) Applicant: Broadcom Corporation, Irvine, CA (US)

(72) Inventor: Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 4 days.

(21) Appl. No.: 13/675,757

(22) Filed: Nov. 13, 2012

(65) Prior Publication Data

US 2014/0053186 A1  Feb. 20, 2014

Related U.S. Application Data

(60) Provisional application No. 61/684,484, filed on Aug. 17, 2012.

(51) Int. Cl.
*H04N 7/167* (2011.01)
*H04N 21/418* (2011.01)
*H04N 21/435* (2011.01)

(52) U.S. Cl.
CPC .......... *H04N 7/167* (2013.01); *H04N 21/4181* (2013.01); *H04N 21/435* (2013.01)
USPC ............. 725/31; 725/109; 725/110; 713/176; 713/189; 726/26; 380/255

(58) Field of Classification Search
CPC .. H04N 7/167; H04N 21/4181; H04N 21/435
USPC ....................................................... 725/31
See application file for complete search history.

(56) References Cited

U.S. PATENT DOCUMENTS

| | | | |
|---|---|---|---|
| 7,113,523 B1* | 9/2006 | Kubota et al. | 370/535 |
| 7,698,718 B2* | 4/2010 | Dellow et al. | 725/28 |
| 7,840,489 B2* | 11/2010 | Candelore | 705/59 |
| 7,965,839 B2* | 6/2011 | Candelore | 380/200 |
| 8,032,761 B2* | 10/2011 | Rodgers et al. | 713/189 |
| 8,156,345 B2* | 4/2012 | Rodgers et al. | 713/189 |
| 8,413,256 B2* | 4/2013 | Gonzalez et al. | 726/27 |
| 2006/0259965 A1* | 11/2006 | Chen | 726/20 |
| 2007/0005506 A1* | 1/2007 | Candelore | 705/59 |
| 2007/0266438 A1* | 11/2007 | Rodgers et al. | 726/26 |
| 2008/0086628 A1* | 4/2008 | Rodgers et al. | 713/1 |
| 2009/0208006 A1* | 8/2009 | Candelore | 380/200 |
| 2009/0285401 A1* | 11/2009 | Moroney et al. | 380/278 |
| 2010/0005484 A1* | 1/2010 | Candelore et al. | 725/31 |
| 2010/0058485 A1* | 3/2010 | Gonzalez | 726/27 |
| 2010/0100940 A1* | 4/2010 | Reynolds | 726/4 |
| 2010/0158480 A1* | 6/2010 | Jung et al. | 386/94 |
| 2010/0255772 A1* | 10/2010 | Hellman | 455/3.06 |
| 2010/0299750 A1* | 11/2010 | Chen | 726/20 |
| 2011/0191572 A1* | 8/2011 | Taylor et al. | 713/1 |
| 2011/0197069 A9* | 8/2011 | Rodgers et al. | 713/176 |
| 2011/0314145 A1* | 12/2011 | Raleigh et al. | 709/224 |

(Continued)

*Primary Examiner* — Nasser Goodarzi
*Assistant Examiner* — Michael B Pierorazio
(74) *Attorney, Agent, or Firm* — Brinks Gilson & Lione

(57) ABSTRACT

A system includes a transport central processing unit of an information appliance device. The transport central processing unit receives a message from a head-end. The transport central processing unit provides access of the message to the security processing unit. A host central processing unit connected with the transport central processing unit is prohibited access to the message.

20 Claims, 3 Drawing Sheets

(56) References Cited

U.S. PATENT DOCUMENTS

| | | | |
|---|---|---|---|
| 2012/0030391 A1* | 2/2012 | Rodgers et al. | 710/110 |
| 2012/0131606 A1* | 5/2012 | Lejeune et al. | 725/31 |
| 2012/0180097 A1* | 7/2012 | Addington et al. | 725/109 |
| 2012/0196565 A1* | 8/2012 | Raleigh | 455/406 |
| 2012/0197792 A1* | 8/2012 | Raleigh | 705/40 |
| 2012/0201133 A1* | 8/2012 | Raleigh | 370/230 |
| 2012/0203677 A1* | 8/2012 | Raleigh | 705/30 |
| 2012/0216034 A1* | 8/2012 | Chen et al. | 713/153 |
| 2012/0216038 A1* | 8/2012 | Chen et al. | 713/168 |
| 2012/0224688 A1* | 9/2012 | Rodgers et al. | 380/203 |
| 2012/0224689 A1* | 9/2012 | Rodgers | 380/255 |
| 2012/0226900 A1* | 9/2012 | Rodgers et al. | 713/150 |

\* cited by examiner

SECURITY PROCESSING UNIT WITH SECURE CONNECTION TO HEAD END

PRIORITY CLAIM

This application claims priority to U.S. Provisional Application Ser. No. 61/684,484, filed Aug. 17, 2012, which is incorporated herein by reference in its entirety.

TECHNICAL FIELD

This disclosure relates to securing broadcasts in a system, and to a security central processing unit with a secure connection to a broadcast head-end.

BACKGROUND

Advances in electronics and communications technologies driven by consumer demand can result in the widespread adoption of data-driven devices, including those for handling and converting third party media content. Third party media providers, such as satellite and cable companies, may desire to have their content handled securely such that the content is not copied or used outside of certain permission levels.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

A system and method can send messages securely from a broadcast head-end to a security processor, e.g., of an information appliance device, without passing through a host computer of the information appliance device. The messages can include instructions to the security processor, e.g., to address a hacking or cloning situation in the information appliance device.

Figure 1:
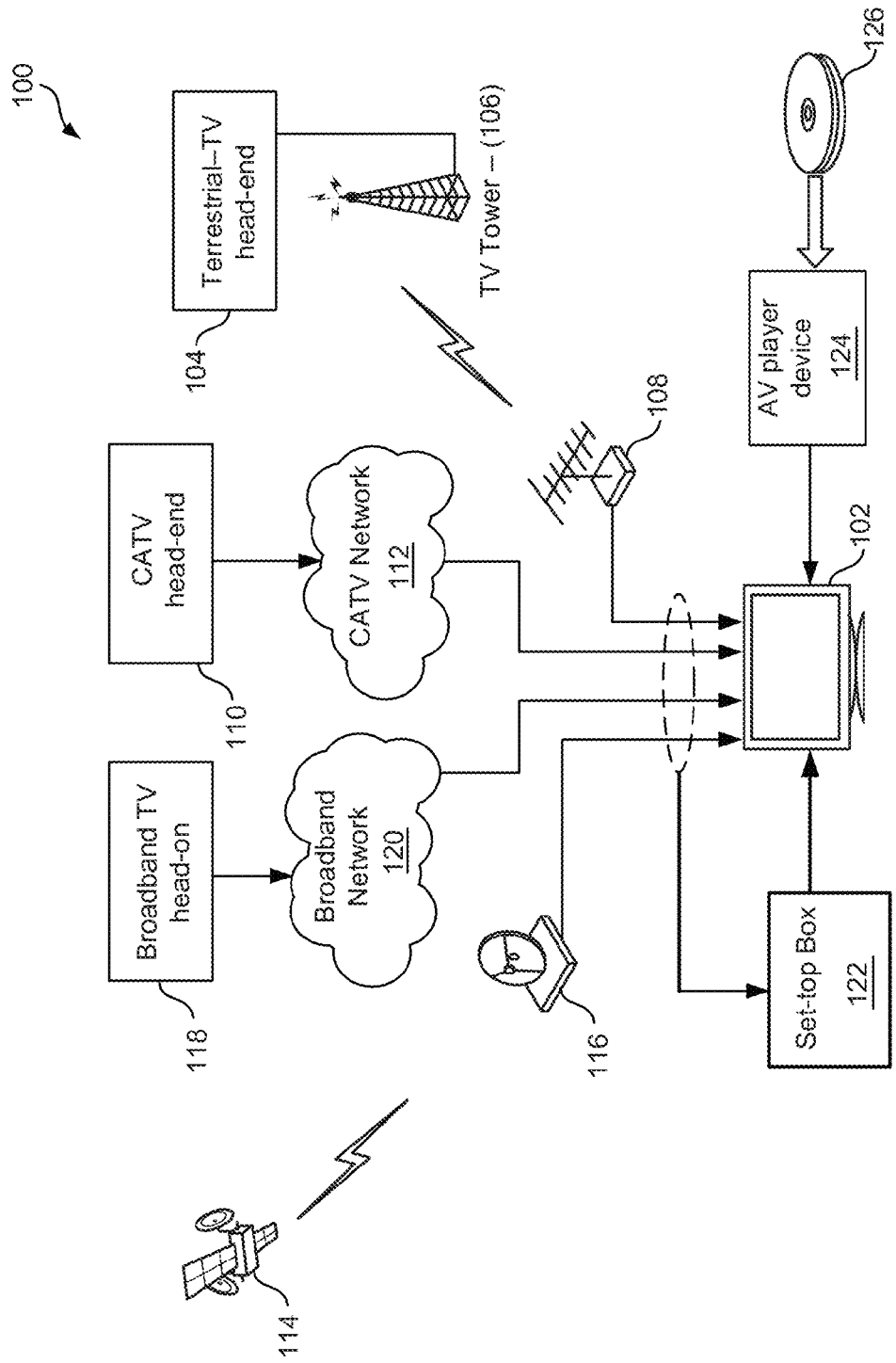
FIG. 1 is a block diagram of an exemplary video system that supports playback of TV broadcasts and local feeds.

FIG. 1 is a block diagram of an exemplary broadcast system 100 that supports playback of TV broadcasts and local feeds from broadcast head-ends to information appliance devices. In FIG. 1, the broadcast system 100 may include a display device 102, a terrestrial-TV head-end 104, a TV tower 106, a TV antenna 108, a cable-TV (CATV) head-end 110, a cable-TV (CATV) distribution network 112, a satellite-TV head-end 114, a satellite-TV receiver 116, a broadband-TV head-end 118, a broadband network 120, a set-top box 122, and an audio-visual (AV) player device 124. The head-ends can include an installation that is the point from which video, audio and other data feeds are received for multiple channels, stored, processed and transmitted to broadcast users. In addition to transmitting equipment, a head-end can contain feeds for various channels.

In operation, the display device 102 may be utilized to play video streams, which may be received from broadcast head-ends and/or from one or more local sources, such as the AV player device 124. The display device 102 may, for example, receive TV broadcasts via the TV antenna 108 from the terrestrial-TV head end 104; cable-TV broadcasts, which may be communicated by CATV head-end 110 via the CATV distribution network 112; satellite TV broadcasts, which may be received via the satellite receiver 116; and/or Internet multimedia broadcasts, which may be communicated by the broadband-TV head-end 118 via the broadband network 120. TV head-ends may utilize various formatting schemes in TV broadcasts. The display device 102 may be operable to directly process multimedia/TV broadcasts to enable playing of corresponding video and/or audio data.

Additionally or alternatively, another device, for example the set-top box 122, may be utilized to perform processing operations and/or functions, which may be operable to extract video and/or audio data from received media streams, and the extracted audio/video data may then be played back via the display device 102. The display device 102 may also be utilized to display video data inputted from the local sources, such as the AV player device 124. In this regard, the AV player device 124 may read and/or process multimedia data stored into multimedia storage devices, such as DVD or Blu-ray discs, and may generate corresponding video data that may be displayed via the display device 102.

The display 102, set-top box 122 and/or AV player device 124, or other information appliance device, may include suitable logic, circuitry, interfaces and/or code which may enable processing TV and/or multimedia streams/signals received from one or more broadcast head-ends, to enable generation of video, audio and/or other data that may be played via the display device 102. The display 102, set-top box 122 and/or AV player device 124 may perform at least some of the video/audio processing, and/or may also provide additional functions, such as encryption and/or access control related functions, such as digital right management (DRM) related processing.

Figure 2:
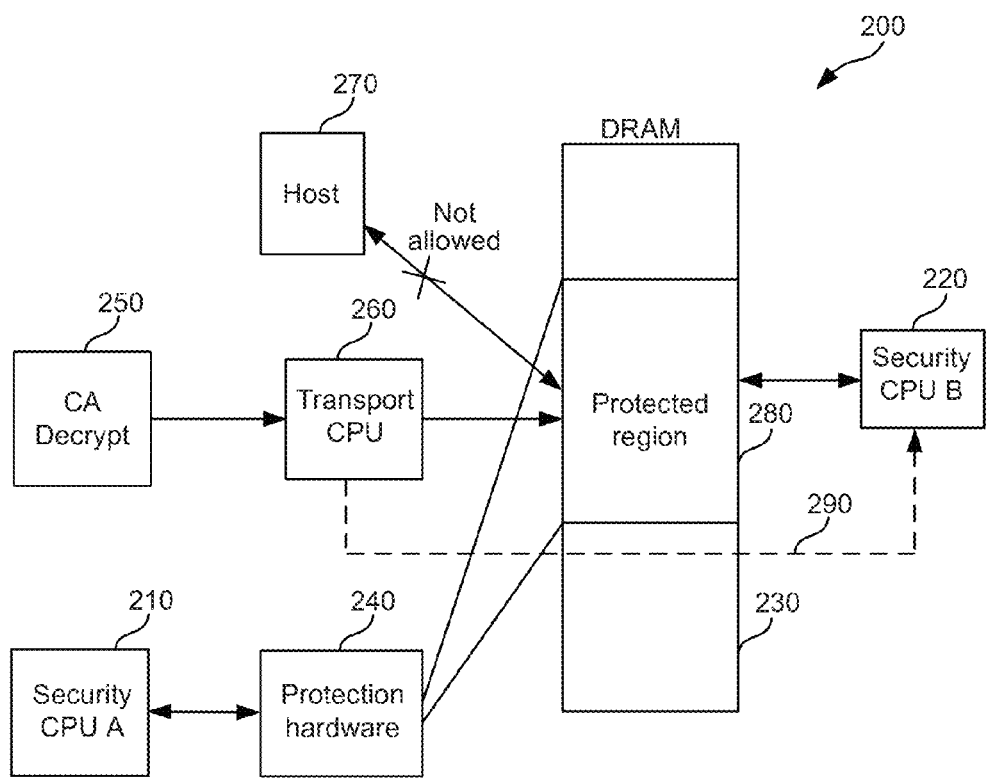
FIG. 2 is a block diagram of an exemplary processing system for securely handling data signals sent from the head-ends to information appliance devices.

FIG. 2 is a block diagram of an exemplary processing system 200 for securely handling data signals sent from the head-ends, e.g., terrestrial-TV head-end 104, CATV head-end 110, and broadband TV head-end 118 to information appliance devices, e.g., device 102, set-top box 122 and AV player device 124. The processing system 200 can be included as part of the logic, circuitry, interfaces and/or code of the display 102, set-top box 122 and/or AV player device 124. The system 200 can include a first processing unit 210, e.g., security CPU A, a second processing unit 220, e.g., security CPU B, and a memory 230, e.g., dynamic random access memory 230. Protection hardware 240 can connect the first processing unit to the memory 230. The processing system 200 can also include a post condition access (CA) decrypt module 250, a transport CPU 260 and a host computer 270.

The processing system 200 can securely handle data signals by passing messages of the data signals directly from the broadcast head-end to the first processing unit 210 or the second processing unit 220 of the information appliance device, without passing through the host computer 270 of the information appliance device. This can provide an advantage, for example, if the host computer 270 or other components of the information appliance device is hacked or cloned.

In a security-based broadcast system, the head-end may want to provide security controls to a set-top box 122, or other information appliance device, which is suspected of being hacked. In the case that the host computer 270 is compromised, there may be little the head-end can do, as the other processors in the processing system 200 cannot receive messages from the head-end without intervention by the host computer 270. If the host computer 270 is not trusted, there may be no secure connection with the head-end without tying messages to electronic counter measures (ECMs). Although the first processing unit 210 and the second processing unit 220 can include security functionality, security processor often rely on the host computer 270 for direction, e.g., for key processing. Messages may be encrypted to the host computer 270, but if the host computer 270 fails to deliver the messages and is not tied to keys, the head-end may not be able to deliver the desired control to the information appliance device.

To securely send messages from the head-end to the second processing unit 220, the CA decrypt module 250 can receive and decrypt messages in the data signals sent from the head-ends to the information appliance device. The CA decrypt module 250 sends the decrypted messages to the transport CPU 260 to parse the messages and flag packets to be sent to the second processing unit 220, but not the host CPU 270. The transport CPU 260 may detect the message, for example, by looking for patterns in the messages after decryption. Other ways to detect the messages can include, for example, including identifying message start codes in the messages to be send directly to the second processing unit 220. The message can include instructions to the second processing unit 220 to shut down the information appliance device to address a hacking or cloning situation, or other instructions such as to reset the information appliance device without shutting it down. The transport CPU 260 can provide access of the head-end message to the second processing unit 220 while prohibiting access of the message to the host CPU 270.

A protected region 280 of memory 230 may be allocated, e.g., by the first processing unit 210, to store the message or packets only accessible to the first processing unit 210, the second processing unit 220 and the transport CPU 260, but not accessible to the host CPU 270 and without involving the host CPU 270. The protected region 280 can be protected with protection hardware 240 that includes, e.g., an address range checker, to ensure that only the transport CPU 260, the first processing unit 210 and second processing unit 220 may access the protected region 280, and not the host CPU 270. The protection hardware 240 can be controlled by the first processing unit 210 to physically block the host computer 270 access to protected region 280 where sensitive data is stored. While the host computer 270 is not allowed access to this region, the protection hardware 240 allows the transport CPU 260, the first processing unit 210 and the second processing unit 240 to write and read messages to/from the protected region 280.

Additionally or alternatively, the transport CPU 260 can communicate the secure message directly to the second processing unit 220, e.g., via a dedicated channel 290, e.g., without involving the memory 230 and the host computer 270. The transport CPU 260 can directly write the message to an internal memory of the second processing unit 220. The internal memory of the second processing unit 220 is protected from modifications, e.g., using checkers. The message can include instructions from the head-end to reset or shut down the device, e.g., set-top box 122. The second processing unit 220 can execute the instructions. The host computer 270, which could be hacked, does not interfere with execution of the instructions since it never receives the message.

Figure 3:
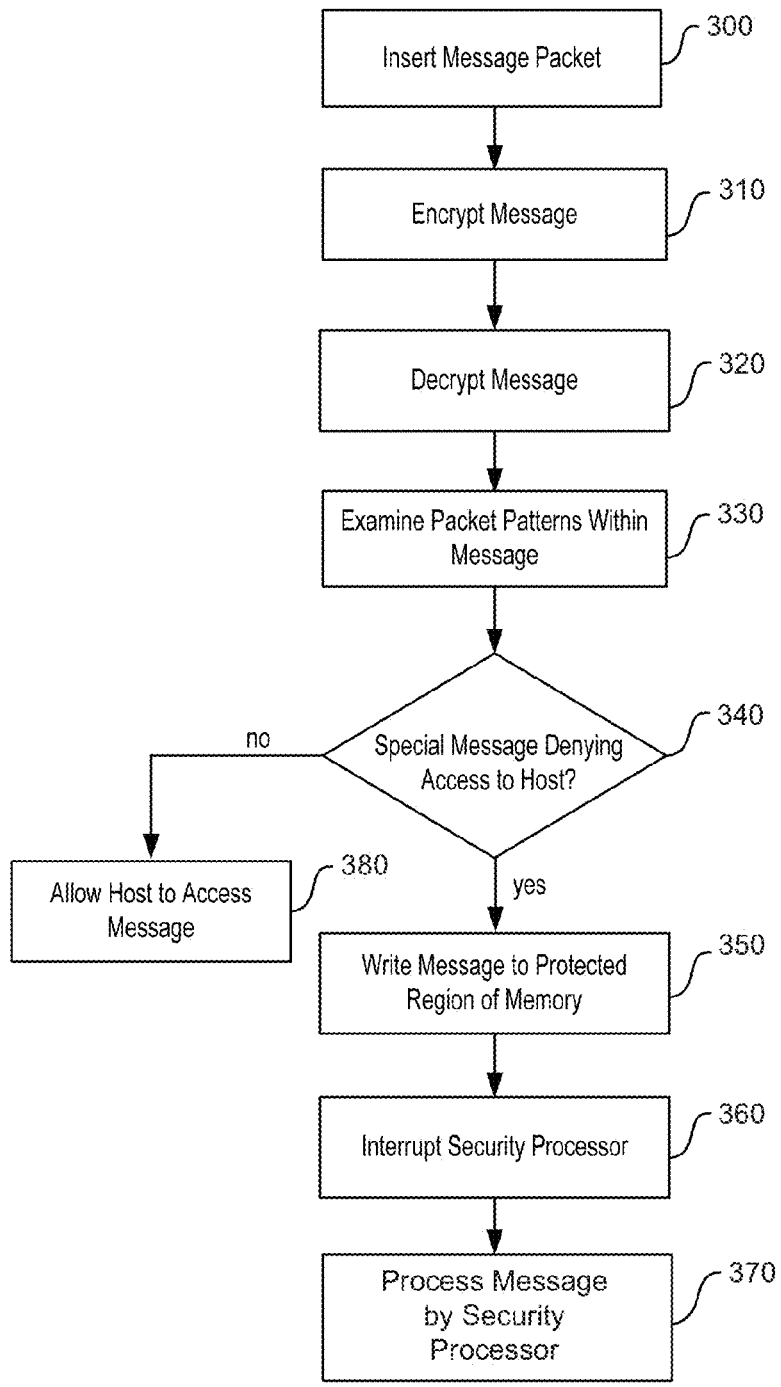
FIG. 3 is a flowchart describing an exemplary process for securing messages sent from the head-ends to information appliance devices.

FIG. 3 is a flowchart describing an exemplary process for securing messages sent from the head-ends to the information appliance devices, e.g., set-top box 122. The head-end may insert in the video, audio or other data stream a message packet indicating a message is only meant for the first processing unit 210 or the second processing unit 220, but not the host CPU 270 (300). The messages can be encrypted, e.g., with CA encryption, along with the encrypted video or audio data stream (310). By including the secure messages with the video and audio data stream, the messages may not be easily identified, e.g., by a hacker, and the messages can be extracted by a system with CA decryption capabilities. At the information appliance device, e.g. set-top box 122, the video/audio/messages can be decrypted by the CA decrypt module 250 using CA decryption (320). Other types of encryption and decryption processes can be used. The transport CPU 260 can examine patterns within the packets to determine if this is a message from the head-end that is not meant for the host CPU 270 (330). The message may be carried in the video and audio elementary stream (ES) layers, or with special packets with a different Program ID (PID).

A base layer of video and audio data can include the ES; the raw compressed data. The ES data can be assembled into large variable-sized packets called PES, with a header, and then those packets can be parsed into fixed-lengths, e.g., 188-byte packets, called transport packets, with each transport packet having a header, e.g., 4 byte or more depending on the fields it contains. The transporting can be implemented with an MPEG-2 transport layer or other transport formats. File formats can use a different packet format but at the base layer there is ES data. The messages can be included in these headers. Carrying the messages in the video and audio ES layers can have the advantage that once the video/audio is encrypted by CA, the messages are not visible, and therefore cannot be removed from the stream.

If the packet is a head-end message that denies access to the host CPU 270, the transport CPU 260 can write the message to the protected region 280 of memory 230 (350). The transport CPU 260 can also interrupt the second processing unit 220, e.g., security CPU B, to make the second processing unit 220 aware of the message (360). The second processing unit 220 can read the message and processes it by executing instructions in the message, e.g., to thwart a hacking or cloning situation (370). If the message does not deny access to the host CPU 270, the message is not stored to the protected region 280 and the host computer 270 can access the message (380).

A benefit of this approach is that the head-end can send messages to a security processor to configure the information appliance device, without relying on the host CPU 270 to process those messages. The head-end messages can travel directly to the first processing unit 210 and the second processing unit 220, and bypass the host CPU 270. Two security CPUs can be used for the first processing unit 210 and the second processing unit 220, e.g., in a multi-trust system. The first processing unit 210 can include a traditional security CPU with access to high value secrets, and which normally receives commands from the host CPU 270. The second processing unit 220 can include an intermediate level security CPU. The first processing unit 210 can control the protected region 280 of memory 230 and the second processing unit 220 can perform actions based on the secure messages. Actions based on the messages can include shutting down the information appliance device that was hacked or cloned. Additionally or alternatively, more or less security CPUs may be used.

In a broadcast system 100 that includes two-way communications between the head-end and the information appliance device, the head-end may instruct the second processing unit 220 to return information to the head-end without the return information passing through the host computer 270 of the information appliance device. For example, the CATV head-end 110 may instruct the security CPU B of the set-top box 122 to return one-time programmable (OTP) configuration information or other settings. The OTP configuration information can indicate information about a compromised set-top box to allow traitor tracing, e.g., the identification of a set-top box that is performing cloning. Security CPU B can form a message including the OTP configuration information and send it back to the head-end without involving the host computer 270.

While various embodiments have been described, it will be apparent that many more embodiments and implementations are possible. Accordingly, the systems and methods are not to be restricted except in light of the attached claims and their equivalents.

What is claimed is:

1. A system, comprising:
a transport central processing unit of an information appliance device, the transport central processing unit configured to:
receive a message from a head-end; and
determine an intended recipient unit for the message;
a security processing unit connected with the transport central processing unit, the transport central processing unit configured to provide access of the message to the security processing unit; and
a host central processing unit connected with the transport central processing unit, the transport central processing unit configured to prohibit access of the message to the host central processing unit responsive to the determination.

2. The system of claim 1, where the message includes instructions for the security processing unit to shut down or reset the information appliance device.

3. The system of claim 1 further comprising a memory of the information appliance device, the memory including a protected region to store the message from the head-end for access by the security processing unit but not the host central processing unit.

4. The system of claim 3, further comprising a second security processing unit connected with the memory to establish the protected region of the memory.

5. The system of claim 4, further comprising a protection hardware connected with the second security processing unit, the protection hardware to control access to the protected region of the memory.

6. The system of claim 1, further comprising a post condition access decrypt module connected with the transport central processing unit, the post condition access decrypt module to decrypt the message from the head-end for sending to the transport central processing unit.

7. The system of claim 1, where the head-end comprises at least one of a cable television head-end, a broadband head-end and a terrestrial television head-end.

8. The system of claim 1, further comprising a dedicated channel to send the message from the transport central processing unit to the security processing unit.

9. The system of claim 1, where the message is included in a video, audio or other data stream.

10. The system of claim 9, where the information appliance device comprises a set-top box.

11. An information appliance device, comprising:
a host central processing unit connected with a memory having a protected region, where the host central processing unit is not configured to have access to the protected region;
a security central processing unit connected with the memory, where the security central processing unit is configured to have access to the protected region of the memory; and
a transport central processing unit configured to:
determine when a message from a head-end is not intended for the host central processing unit; and
responsive to the determination, store the message from the head-end in the protected region without passing the message through the host central processing unit.

12. The information appliance device of claim 11, where the message is included in a video, audio or other data stream sent by the head-end.

13. The information appliance device of claim 11, further comprising a second security central processing unit connected with the memory to establish the protected region of the memory.

14. The information appliance device of claim 11, where the message includes instructions to shut down or reset the information appliance device.

15. A method, comprising:
receiving an encrypted video, audio or other data stream from a head-end, the video, audio or other data stream including a message inserted in the video, audio or other data stream, the message being only meant for a security processing unit of an information appliance device, but not a host central processing unit of the information appliance device;
decrypting the video, audio or other data stream including the message;
determining that the message is not meant for the host central processing unit; and
responsive to the determination, providing the message to the security processing unit but not providing the message to the host central processing unit.

16. The method of claim 15, further comprising executing the message to shut down or reset the information appliance device.

17. The method of claim 15, further comprising storing the message in a protected area of memory accessible to the security processing unit but not accessible to the host central processing unit.

18. The method of claim 17, where the message requests a return of information to the head-end without the return information passing through a host computer of the information appliance device.

19. The method of claim 18, where the information includes sending the message by a dedicated channel from a transport central processing unit to the security processing unit.

20. The information appliance device of claim 11, where the transport central processing unit is configured to establish a dedicated channel with the security central processing unit to store the message.

* * * * *